United States Patent [19]
Levin et al.

[11] 3,895,706
[45] July 22, 1975

[54] ARRANGEMENT FOR FEEDING THE BULBS OF ELECTRIC VACUUM DEVICES

[76] Inventors: Solomon Isaakovich Levin, ulitsa Sovetskaya 79, kv. 12; Valentin Terentievich Samonov, ulitsa Svetotekhniki 53, kv. 49; Nikolai Ivanovich Tsygankin, ulitsa Anny Luss, 2, kv. 25; Nadezhda Serafimovna Khoroneko, ulitsa Svetotekhnik, 119, kv. 41, all of Saransk, U.S.S.R.

[22] Filed: May 11, 1973

[21] Appl. No.: 360,373

[52] U.S. Cl. ............................... 198/127 R; 198/32
[51] Int. Cl. ............................................ B65g 13/04
[58] Field of Search ...................... 198/127 R, 32

[56] References Cited
UNITED STATES PATENTS 1,735,472  11/1929  O'Neill ........................... 198/127 R
3,265,206  8/1966  Allen ................................. 209/104

*Primary Examiner*—Evon C. Blunk
*Assistant Examiner*—Jeffrey V. Nase
*Attorney, Agent, or Firm*—Waters, Schwartz & Nissen

[57] ABSTRACT

An arrangement for feeding the bulbs of electric vacuum devices, comprising: a conveyor for loading the bulbs into an automatic exhausting-and-sealing off machine; a mechanism for feeding the bulbs to said conveyor, made as a set of sections, each being essentially a system of consecutively arranged shafts having disks fitted thereon, said disks, while rotating, impart progressive motion to the bulbs, the number of shafts in each following section being less than that in a preceding section.

2 Claims, 3 Drawing Figures

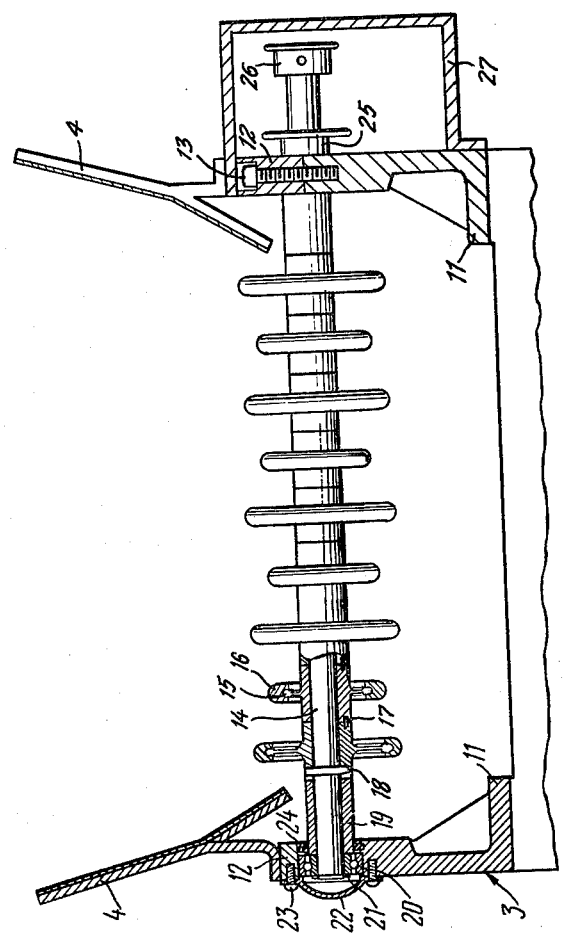
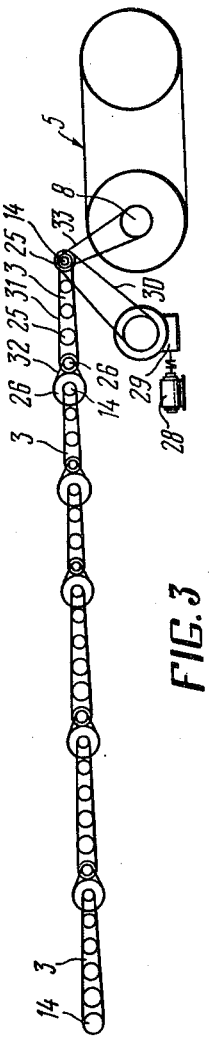
FIG. 2
FIG. 3

ARRANGEMENT FOR FEEDING THE BULBS OF ELECTRIC VACUUM DEVICES

This invention relates generally to electrical engineering industry and more specifically to equipment for producing electric vacuum devices, such as a general-purpose filament lamps; the invention has particular reference to arrangements for feeding the bulbs of electric vacuum devices.

It is known to widely employ arrangements for feeding the bulbs of electric vacuum devices, comprising conveyers for loading the bulbs into an automatic exhausting-and-sealing off machine. Said arrangements are made as intermittent-action chain conveyers carrying seats for the bulbs; loading of the bulbs into the nests is carried out manually when the conveyer is at dwell, while travelling of the conveyer to a next loading position is an idle run.

Cardinal disadvantages inherent in said arrangement are low production efficiency, restricted possibilities of increasing the latter due to manual loading of the bulbs into the conveyer seats. Any increase in the production efficiency of such arrangements is practicable by reducing conveyer running time and cutting down the loading time of bulbs. In the former case heavy inertia overloads are liable to arise during conveyer travelling to a next loading position which practically hampers any considerable increase in the production efficiency of said arrangements.

It is an object of the present invention to provide an arrangement for feeding the bulbs of electric vacuum devices that would enable an automatic feeding of bulbs to the conveyer for bulb loading into an automatic exhausting-and-sealing off machine.

Said object is accomplished by the fact that an arrangement for feeding the bulbs of electric vacuum devices, comprising a conveyer for loading the bulbs into an automatic exhausting-and-sealing off machine, according to the invention is provided with a mechanism for feeding the bulbs of electric vacuum devices to said conveyer, said mechanism being made as a set of sections each being essentially a train of consecutively arranged shafts carrying disks fitted thereon, rotation of which disks results in progressive motion of the bulbs, the number of shafts in each following section being less than in a preceding one.

It is expedient that the arrangement for feeding the bulbs of electric vacuum devices be so made that the diameter of the disks on each following shaft in each section be in excess of the diameter of the disks set on a preceding shaft.

It is likewise expedient that the arrangement for feeding the bulbs of electric vacuum devices be so embodied that the number of disks on each following shaft in each section be less than the number of disks in a preceding shaft.

The arrangement according to the invention for feeding the bulbs of electric vacuum devices makes it possible to provide an incessant and trouble-free feeding of bulbs into the seats of the conveyer of an automatic exhausting-and-sealing off machine, to load the bulbs in bulk without stopping the arrangement and attain a two or three times increase its production efficiency as compared to the known arrangements. All this enables the proposed arrangement to be applied in an automatic assembly line for electric vacuum devices.

Given below is a detailed description of a specific embodiment of the proposed arrangement for feed the bulbs of electric vacuum devices to be read in conjunction with the accompanying drawings, wherein:

FIG. 2 is a sectional view representative of, respectively, the last shaft in each section of the arrangement; and FIG. 3 represents a kinematic diagram of the arrangement according to the invention.

Figure 1:
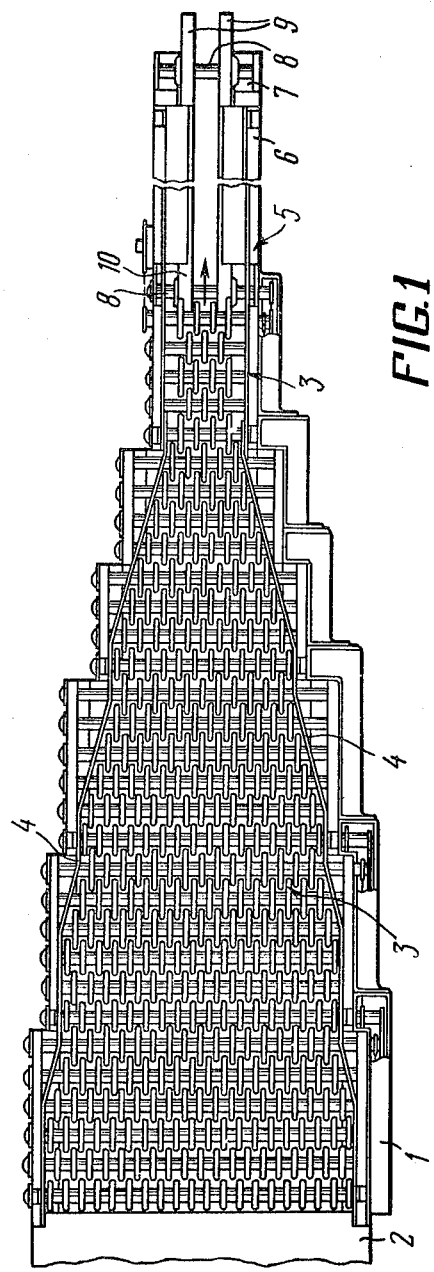
FIG. 1 is a top view of the proposed arrangement for feeding the bulbs of electric vacuum devices.

Referring now to FIG. 1, the arrangement for feeding the bulbs of electric vacuum devices has a plate 1 which serves as a base on which the nentire arrangement is mounted, viz., a bin 2, six sections 3, guides 4 and a conveyer for loading the bulbs into an automatic exhausting-and-sealing off machine (not shown), said conveyer being made as belt conveyer 5. The bin 2 is a metallic structure adapted to serve as a receptacle for bulk-loaded bulbs. The slope of the bin 2 with respect to a horizontal plane is variable and can be adjusted depending upon the throughput capacity of the arrangement. The bin 2 is adapted for a smooth continuous feeding of the bulbs loaded in bulk therein, to the first section 3. Six sections 3 constitute the mechanism for feeding the bulbs to the belt conveyer 5.

The belt conveyer 5 has a plate 6 on which are mounted brackets 7 for supporting shafts 8. Set on the shafts 8 are pulleys 9 over which are stretched two flat belts 10.

The section 3 (FIG. 2) comrpises two bases 11, two covers 12 held to the bases 11 by screws 13. The bases 11 mounts a shaft 14 carrying disks 15 fitted thereon, the salient surface of said disks being coated with a material possessing an increased coefficient of friction, say, a rubber 16. The disks 15 are interconnected through cylindrical pins 17, while the extreme disk 15 is connected to the shaft 14 through a taper pin 18. The shaft 14 is provided with distance sleeves 19. The shaft 14 runs in antifriction bearings 20 retained on the shaft 14 by a check ring 21 and a cap 22 which is held in the base 11 and the cover 12 by screws 23.

The antifriction bearing 20 is protected against penetration of mechanical admixtures by a gland sealing 24. The shaft 14 carries chain sprockets 25 and 26 locked in place thereon and closed by a protective casing 27.

The guides 4 are made of thin steel sheeting, their inner surface being given extra-fine polishing to reduce friction of the bulbs travelling along the guides 4. In their top portion the guides 4 make up an angle with the vertical plane for bettern orienting of the bulbs during their travelling along the sections 3.

A kinematic diagram of the arrangement for feeding the bulbs of electric vacuum devices as represented in FIG. 3, shows an electric motor 28 kinematically associated with a reduction unit 29. The latter is connected, via a chain drive 30, to a sprocket 25 set on the extreme shaft 14 of the extreme section 3. The sprockets 25 locked-in with the shafts 14 are interconnected within each section 3 through a chain drive 31, the number of teeth in the sprockets 25 set on each shaft 14 preceding the extreme one, gradually increasing in such a way that each preceding shaft 14 rotates at lower speed than the preceding shaft does. Rotation from a sprocket 26 set on the first shaft 14 of the last section 3 is transmitted, via a chain drive 32, to a sprocket 26 set on the extreme shaft 14 of the next-to-last section 3. The sprocket 26 has greater number of teeth than the sprocket 26 set on the first shaft 14 of the last section 3. Thus, the extreme shaft 14 of the last section 3 rotates at a highest speed with respect to the remaining shafts 14, reducing of rotational speed occurring consecutively from said extreme shaft 14 to the first shaft 14 of the first section 3. The extreme shaft 14 of the last section 3 is connected, via a chain drive 33, to the shaft 8 of the belt conveyer 5.

The arrangement for feeding the bulbs of electric vacuum devices operates as follows.

When the motor 28 (FIG. 3) is energized rotation is transmitted via the reduction unit 29 and the chain drive 30 to the extreme shaft 14 of the last section 3, whence motion is imparted, through the chain drive 33, to the belt conveyer 5 and through the chain drives 31 and 32, to all the shafts 14 of all the sections 3, along with the disks 15 (FIG. 2) deadly locked thereon. Bulbs are loaded through the bin 2 (FIG. 1) from whence they are fed to the first section 3 (FIG. 2).

The number of the disks 15 provided on each following shaft 14 in each section 3 decreases, while their diameter increases which results, due to increase in rotational speed occurring from the first section 3 to the last one, in an increase in the linear speed of progressive motion of the bulbs bulbs towards the end of each section 3 thus enabling the bulbs to be spread over in a single layer. Besides, the disks 15 (FIG. 2) of different diameters are set on the extreme shaft 14 in all the sections 3 (FIG. 3) and on all the shafts 14 in the last section 3 in such a way that the greater- and the smaller-diameter disks alternate. It is due to this feature that a kind of paths is established, as it were, for the bulbs to travel therealong with the result that, upon leaving the last section 3 (FIG. 1) the bulbs are fed to the conveyer 5 in a single row (the direction of feeding being indicated by the arrow). This also promoted by the fact that each following section 3 is narrower than a preceding one which is attained due to the provision of the guides 4. Thus, bulbs are fed one by one by the belt conveyer 5 to the automatic exhausting-and-sealing off machine (not shown in the drawing).

What is claimed is:

1. An arrangement for feeding bulbs of electric vacuum devices, comprising a conveyor for loading bulbs into an automatic exhausting and sealing-off machine, a mechanism for feeding said bulbs onto said conveyor, said mechanism being a set of successive first through last sections in the feed direction for said bulbs, each said section including a train of a number of consecutively arranged rotatable shafts each having a number of disks mounted thereon, rotation of which is adapted to set said bulbs into progressive motion, the number of the shafts in at least some of said successive sections being less than that in a preceding section, the disks on each following shaft in each respective section being of a diameter larger than the disks on the preceding shaft in said section, disks of different diameters being mounted on a last shaft in all of said sections and on all of the shafts in the last section in the feed direction of said bulbs providing lateral orientation of the bulbs so as to align the latter in the feed direction thereof, the increase in diameter of the disks in the feed direction of the bulbs imparting an increased linear feed velocity to the latter for conveying the bulbs into the machine.

2. An arrangement for feeding bulbs of electric vacuum devices as claimed in claim 1, the number of the disks on each consecutive shaft in at least some of said sections being less than the number of the disks on a preceding shaft.

* * * * *